(No Model.)

O. O. DINSMORE & L. G. LORD.
TIRE HOLDER.

No. 543,726. Patented July 30, 1895.

WITNESSES.
E. A. Woodbury.
N. Ponney.

INVENTORS
Orrin O. Dinsmore
Louville G. Lord
By their Att'y
Henry W. Williams

UNITED STATES PATENT OFFICE.

ORIN O. DINSMORE AND LOUVILLE G. LORD, OF LEWISTON, MAINE.

TIRE-HOLDER.

SPECIFICATION forming part of Letters Patent No. 543,726, dated July 30, 1895.

Application filed May 24, 1895. Serial No. 550,519. (No model.)

*To all whom it may concern:*

Be it known that we, ORIN O. DINSMORE and LOUVILLE G. LORD, citizens of the United States, residing at Lewiston, in the county of Androscoggin and State of Maine, have invented a new and Improved Tire-Holder, of which the following is a specification.

This is a device for supporting a tire—such as a wagon-wheel tire, for example—while it is being measured. When it is necessary to reset a tire it must of course be removed from the wheel and be shrunk in order to make it smaller in circumference. During this process it is necessary to measure the circumference of the felly and then to measure the tire, and to do the latter it is necessary at present for the blacksmith to have a helper to support the tire. Our device is intended to take the place of the helper so that the blacksmith can do the work without assistance.

The nature of the invention is fully described below, and illustrated in the accompanying drawings, in which—

Figure 1:
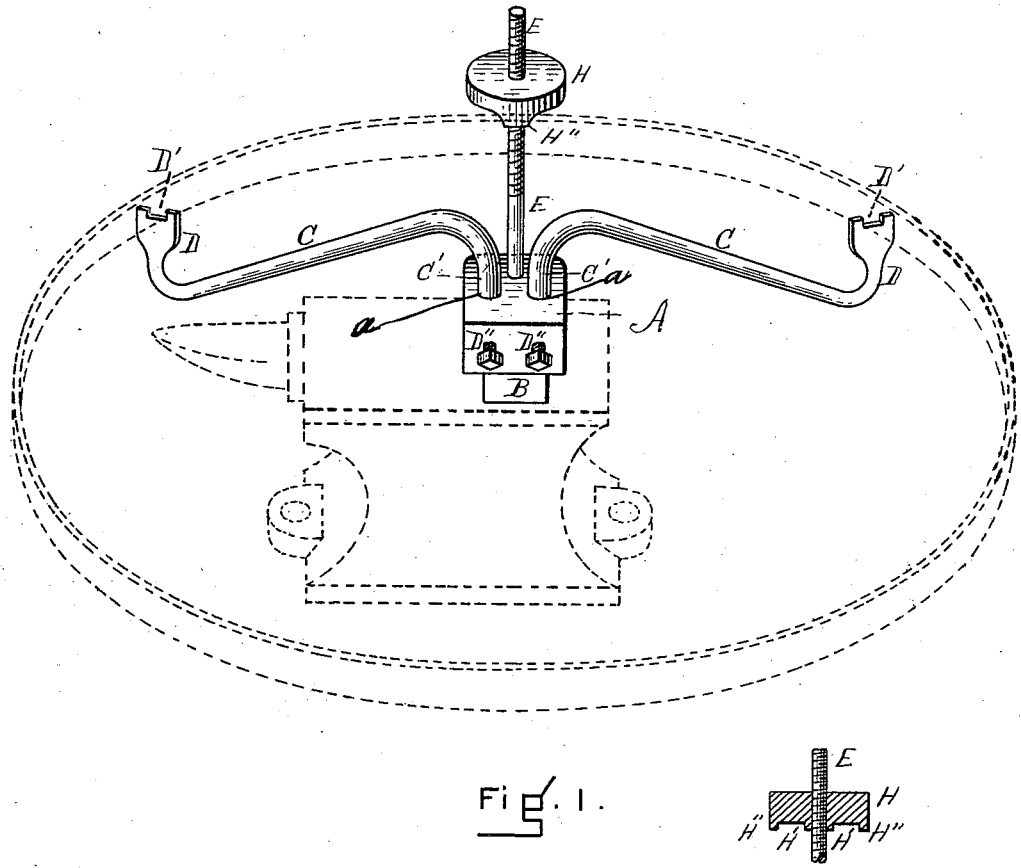
Figure 3:
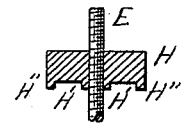
Figure 2:
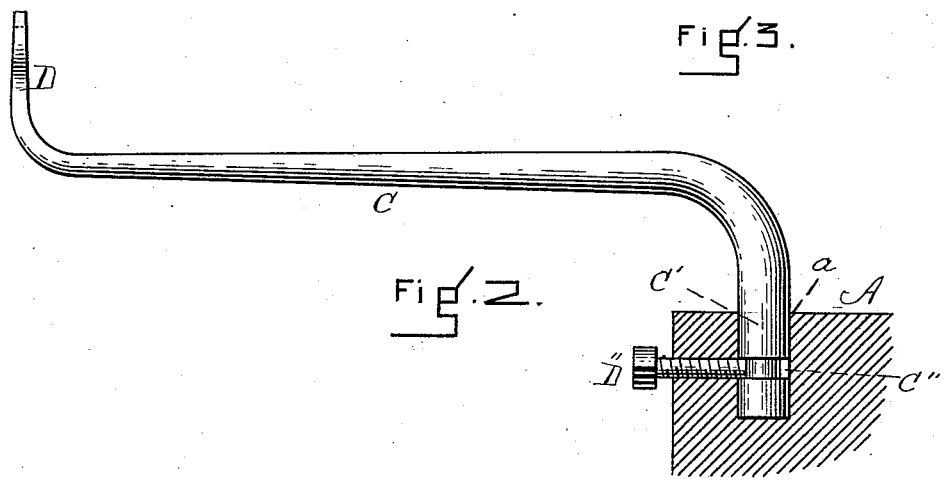

Figure 1 is a perspective view of our device supported by an anvil and supporting a tire, the anvil and tire being shown in broken lines, as they do not form a part of the invention. Fig. 2 is a vertical section and part elevation enlarged. Fig. 3 is a detail in section of the nut which is set down upon the upper edge of the tire.

Similar letters of reference indicate corresponding parts.

A is the base, made preferably of malleable iron and provided with an offset or foot B, adapted to fit into the hardy-hole which is always found in the face of an anvil. The upper surface of this base is provided with two vertical holes $a$, adapted to receive the vertical shanks C' of the horizontal arms C. These shanks are provided with annular grooves C'', and set-screws D'' extend horizontally through the base A into said grooves, thus preventing the shanks from being lifted out of the holes $a$. The outer end of each arm C is bent up vertically into the holder D, which is flattened at right angles to the line of the arm and has its upper edge formed into a substantially rectangular notch D'.

E is a vertical rod extending from the base A and screw-threaded from its upper end for the greater portion of its length. On this thread runs a nut H, which is provided on its under side with grooves H', lips H'' being formed on the outer edge of each groove.

The tire to be measured is placed in a substantially-horizontal position, and is laid with its under edge in the notches D', the arms C being swung so as to accommodate the size of the tire, while its upper edge extends into one of the grooves H' on the under surface of the nut H. In other words, the arms C, by means of the notches D', support the tire from the under side, while the nut H, by means of one of its grooves H', bears on the upper edge of the tire and holds it down. The set-screws D serve to hold the arms securely in the position assumed while they are supporting the tire, such position varying, of course, according to the diameter of the tire. The nut H is lowered or raised according to the width of the tire, and more than one groove or notch H' is provided in order to accommodate tires of different diameters. For example, a tire of large diameter would have its upper edge engaged by the groove H', which is behind the vertical rod E, while a tire of smaller diameter could be engaged by the groove H' which is in front of the rod E. This is, of course, because a large tire should be supported nearer its center than a small one, for obvious reasons.

Having thus fully described our invention, what we claim, and desire to secure by Letters Patent, is—

1. The herein described improved device for holding tires, comprising a base provided with vertical holes in its upper surface, a plurality of horizontal arms C provided with shanks C' extending into said holes, said arms being provided with upturned ends D notched at D' to receive the tire and said arms being free to rotate horizontally, a screw-threaded rod extending vertically from the base, and a nut running on said rod and adapted to bear against the upper edge of the tire, substantially as set forth.

2. The herein described improved device for holding tires, comprising the base A provided with the vertical holes $a$ in its upper surface, the horizontal rods C provided with the vertical shanks C' adapted to rest in said holes and formed with the annular grooves C'', said rods being formed at their outer ends into the upturned portions D notched at D' to receive the tire, set screws extending through the base into said grooves, the screw-threaded rod E extending up from the base, and the nut H running on the thread of said rod and formed on its under surface with the grooves H' and lips H'' whereby the upper edge of the tire is held, substantially as described.

ORIN O. DINSMORE.
LOUVILLE G. LORD.

Witnesses:
ALTON J. NEAL,
HERBERT E. CARISS.